W. DUBILIER.
VARIABLE CONDENSER.
APPLICATION FILED SEPT. 28, 1921.
1,429,227.
Patented Sept. 19, 1922.
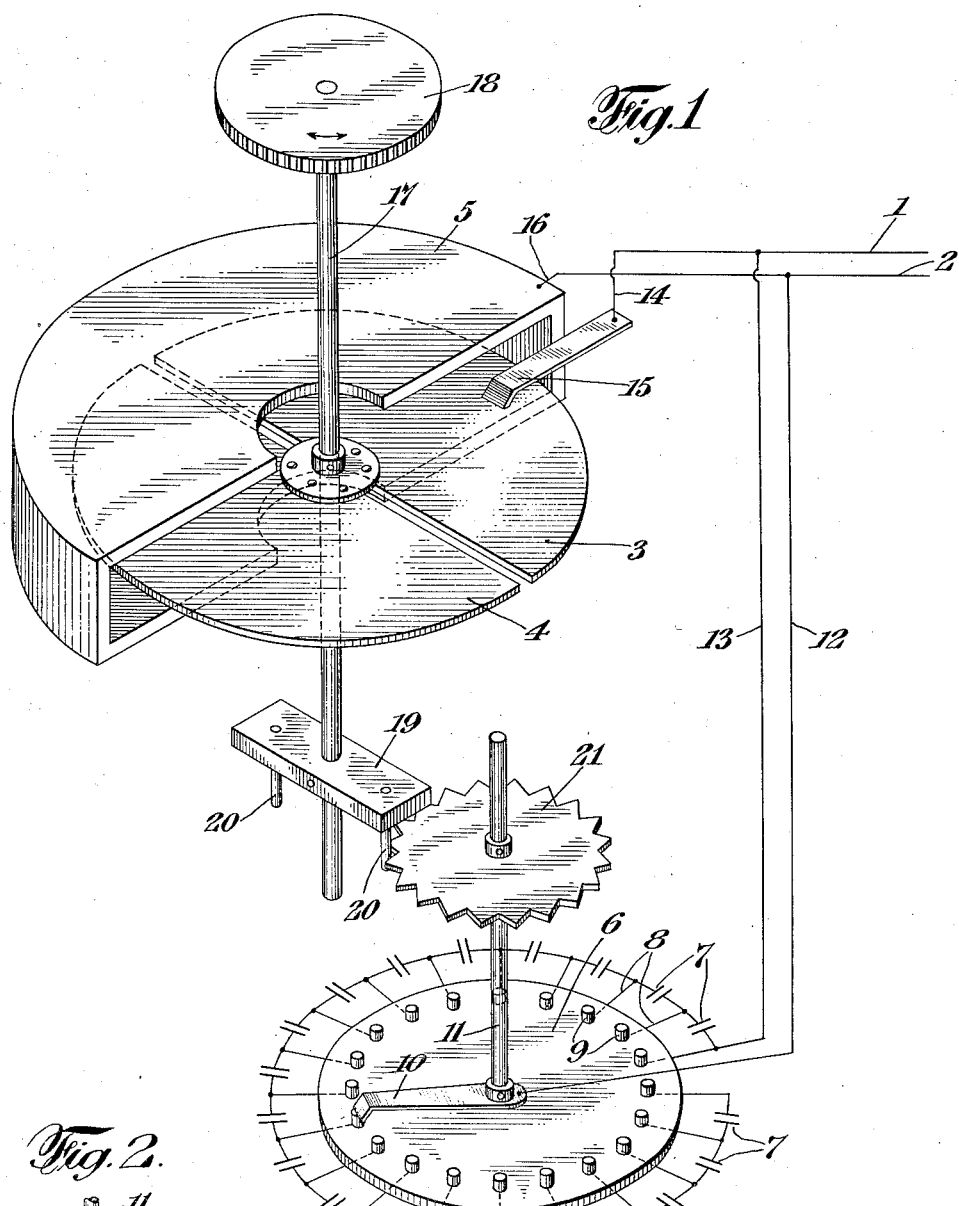
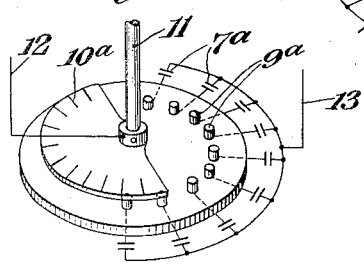
William Dubilier, Inventor
By his Attorneys
Prindle, Wright & Small Patented Sept. 19, 1922.

1,429,227

UNITED STATES PATENT OFFICE.

WILLIAM DUBILIER, OF NEW YORK, N. Y., ASSIGNOR TO DUBILIER CONDENSER & RADIO CORPORATION, A CORPORATION OF DELAWARE.

VARIABLE CONDENSER.

Application filed September 28, 1921. Serial No. 503,997.

*To all whom it may concern:*

Be it known that I, WILLIAM DUBILIER, a citizen of the United States, a resident of New York, in the county of New York and State of New York, have invented a certain new and useful Variable Condenser, of which the following is a specification.

The invention relates to a condenser adapted to assume any desired capacity value between maximum and minimum limits, and more particularly to a condenser in which the above results are accomplished by combining the capacity of a condenser of the fixed type in which the plates bear a permanent and fixed relationship to each other, with the capacity of a condenser of the variable type having a plate or plates shiftable in position as regards plates of opposite polarity to vary its capacity.

The fixed condenser is made up of sections or units which may be cut into or out of circuit to obtain what may be termed stepped capacity values over the desired range of the instrument, and the variable condenser is arranged to supplement the capacity of the fixed condenser in order to obtain the resultant capacity values which are intermediate the values obtainable by adjustment of the fixed condenser alone.

The invention has for an object to provide a condenser of the above type which may be adjusted to cause the capacity to rise or fall progressively and uniformly, or which may be adjusted to produce a straight line curve in capacity changes, and in its preferred form a single operating member is provided which serves both to adjust the capacity of the fixed condenser to different values and to shift the capacity of the variable condenser in such manner that, substantially throughout its entire range of movement, changes in capacity are effected substantially proportional to the amount or degree of movement imparted to the operating member.

Further objects and advantages of the invention will be in part obvious and in part specifically pointed out in the description hereinafter contained, which, taken in connection with the accompanying drawings, discloses a preferred embodiment thereof; such embodiment, however, is to be considered merely as illustrative of its principle. In the drawings:

Fig. 1 is a perspective view somewhat diagrammatically illustrating a condenser adapted to operate in accordance with the invention.

Fig. 2 is a detailed view showing a modified form of fixed condenser adapted to be used in place of the fixed condenser illustrated in Fig. 1.

In condensers of the above type when the fixed condenser is adjusted to the capacity value nearest the desired capacity, it is necessary then to shift the variable condenser to make up the difference, and if the resultant capacity differs from the capacity value at which the fixed condenser is adjusted, by an amount nearly equal to the difference between fixed capacity values obtainable, the variable condenser must be shifted substantially to maximum capacity value to obtain such desired resultant capacity. However, if a resultant capacity value is then desired which will necessitate adjusting the fixed condenser, for example, to the capacity value next greater than the one above mentioned, at the time when this adjustment is made, the capacity of the variable condenser should be shifted suddenly from maximum to minimum, otherwise the instrument will operate irregularly.

In accordance with the present invention the above results are obtained by making up the variable condenser in two parts and shifting the plates in such manner that, just prior to the time when the fixed condenser is shifted from one value to the adjacent value, one of the parts of the variable condenser may be shifted to approach maximum capacity value, and the other of its parts shifted to minimum capacity value, and at the instant the fixed condenser is adjusted as aforesaid the part of the variable condenser which is at maximum is cut out of circuit, and the part which is at minimum capacity value is substituted in circuit therefor.

Referring to the drawings, I have shown conductors 1 and 2, which may be considered as leading to proper terminals for the instrument. Two conducting plates 3 and 4, insulated from each other and of sector-like shape, constitute the shiftable elements respectively of the two parts of the variable condenser, and in the present instance both of said plates co-operate with a common stationary condenser element 5 of opposite polarity. It will be observed that if the plates 3 and 4 be moved angularly with regard to the common stationary element 5, the capacity of the two variable condensers constituted thereby changes inversely in such manner that when the capacity of plate 3 with regard to element 5 is at a maximum, the capacity of plate 4 with regard thereto is at a minimum, since in such position plate 4 is substantially wholly outside of the element 5.

The fixed condenser 6 is shown at the bottom of Fig. 1 as consisting of a plurality of units or sections 7 connected in series, with taps 8 leading from between the units 7 to a plurality of contacts 9 selectively engageable by rotary switch arm 10, which in the present instance is carried by and properly insulated from an upwardly extending spindle 11. Thus if the switch arm 10 be connected to one side of the circuit, as by conductor 12, and one of the fixed condenser units 7 to the other side of the circuit, as by means of conductor 13, movement of the switch arm 10 over contacts 9 will cause the condenser to assume stepped capacity values depending in value and in range of adjustment upon the number and individual capacities of the units or sections 7.

The capacities of the different units should be so chosen that a common difference in capacity will exist between adjacent settings of switch arm 10, and the maximum capacity of each of the variable condenser plates 3 and 4 with regard to stationary element 5 thereof should be substantially equal to such common difference. The variable condenser is shown as connected in parallel with the fixed condenser by means of a conductor 14 leading from one side of the circuit to a contact or switch member 15 selectively engageable with the shiftable plates 3 and 4, and a further conductor 16 extending between the stationary variable condenser element 5 and conductor 2.

Thus if, while contact member 10 is in engagement with a given fixed contact 9, and the variable condenser plate 3 be shifted to move into the interior of stationary element 5, the combined capacity of the two condensers will rise uniformly and progressively as the plate 3 is moved until such combined capacity rise has a value just under the capacity value of the next larger setting of the switch arm 10. The arm 10 may then be moved to the adjacent contact 9, and shiftable plate 4, which is then at substantially zero capacity, substituted in circuit for the plate 3 which is substantially at maximum capacity, through the action of the contact member or switch 15.

I prefer to employ a single operating member for effecting the adjustments of the fixed condenser and shifting the variable condenser to change its capacity and substitute one of the plates 3 and 4 for the other at the proper time. In the specific embodiment illustrated the shiftable plates 3 and 4 of the variable condenser are both mounted upon and insulated from a spindle 17 provided with a suitable operating member 18, and the spindle 11 which carries switch arm 10 derives its motion from spindle 17 through suitable speed-reducing mechanism, such as an arm 19 rotating with spindle 17 and carrying pins 20 adapted to engage a toothed wheel 21 on spindle 11. Thus as the operating member 18 is rotated, one of the pins 20 will step the wheel 21 and switch arm 10 ahead from one contact 9 to the contact next adjacent, every half revolution of spindle 17, and the plates 3 and 4 should be so positioned with reference to the contact or switch member 15, that this member shifts between variable condenser plates 3 and 4 exactly simultaneously with the movement of switch arm 10 from one contact 9 to the other. Thus, while switch arm 10 remains stationary, the capacity of the variable condenser part to which circuit is made by switch member 15 will change from one limit to the other, and at the instant that switch arm 10 is adjusted to an adjacent contact, switch 15 will come into engagement with the other part of the variable condenser which is at the opposite limit of its capacity. Therefore, movement of the operating member 18 causes changes in the combined circuit capacity of the variable and fixed condensers which are proportional to the degree of movement imparted to the operating member, or to the distance at which the operating member is located from a position which will cause adjustment of switch arm 10. As the instrument is adjusted, its capacity therefor changes in a straight line curve according to the amount of movement imparted to the operating member.

Fig. 2 shows a modified form of fixed condenser made up of a plurality of sections or units $7^a$ all connected in parallel on one side to conductor 13 and respectively connected on the opposite side to a plurality of fixed contacts $9^a$ engageable with a switch arm $10^a$, and connected to conductor 12. With the arrangement shown in Fig. 2 the fixed condenser units $7^a$, being in parallel, may all be made equal in capacity, and the switch arm 10ª engages simultaneously with a greater or less number of fixed contacts 9ª according to the capacity value desired.

The switch member 15 and switch arms 10 or 10ª preferably are of such extent relative to the conducting parts engaged thereby that circuit is never entirely broken to the variable condenser, nor to the fixed condenser.

It will be understood that the physical structure of the condenser above described may be designed as desired, for example, along the lines disclosed in my co-pending application Serial No. 441,992, filed February 2nd, 1921, entitled Variable Condenser.

While a specific embodiment of the invention has been described, it is obvious that many changes may be made therein without departing from the spirit of the invention as defined in the following claims.

1. In combination a fixed condenser adjustable to different capacities, variable condensers each having a maximum capacity substantially equal to the difference between the fixed capacity values, and means for placing said variable condensers selectively in circuit with said fixed condenser.

2. In combination a fixed condenser adjustable to different capacities, variable condensers each having a maximum capacity substantially equal to the difference between the fixed capacity values, a common operating member for said variable condensers adapted to shift the same to vary their capacities inversely, and means for placing said variable condensers selectively in circuit with said fixed condenser.

3. In combination a fixed condenser adjustable to different capacities, variable condensers each having a maximum capacity substantially equal to the difference between the fixed capacity values, a common operating member for said variable condensers adapted to shift the same to vary their capacities inversely, and means for placing said variable condensers selectively in circuit with said fixed condenser, said variable condensers also having a common plate coacting with separate plates of opposite polarity.

4. In combination, a fixed condenser comprising a plurality of condenser units together with a switch for adjusting the circuit connections to said units to obtain different capacities of said condenser, variable condensers, each having a maximum capacity substantially equal to the difference between the fixed capacity values, a switch for connecting said variable condensers selectively in circuit with said fixed condenser, means being provided whereby the switch associated with said variable condensers functions to change the circuit connections from one variable condenser to the other when the capacities of such condensers are at opposite limits, and simultaneously with the shifting of the first-mentioned switch between fixed condenser units.

5. In combination, a fixed condenser having means including an operating member movable to different positions for adjusting the capacity of said condenser to different values, and means operable substantially throughout the useful range of movement of said operating member for placing in circuit with the fixed condenser a variable capacity substantially proportional in value to the distance at which the operating member is located from an adjacent abovementioned position.

6. In combination, a fixed condenser adjustable to different capacities, means for placing variable capacity in circuit with said fixed condenser, a common operating member movable to different positions to adjust the capacity of said fixed condenser and change the said variable capacity value, means being provided whereby changes in the combined circuit capacity are produced substantially proportional to the amount of movement of said operating member throughout substantially its entire range of useful movement.

7. The method of operating a circuit including a fixed condenser adjustable to different capacities and variable condensers each having a maximum capacity substantially equal to the difference between the fixed capacity values, to obtain uniform changes in the combined capacity of such condensers during adjustment thereof, which comprises connecting one of said variable condensers in circuit with said fixed condenser in one adjustment of the latter (when the variable condenser is at one limit of its range of capacity), shifting said variable condenser to the one limit of its range of capacity, shifting the other variable condenser to the opposite limit of its range of capacity values, adjusting the capacity of said fixed condenser to an adjacent value and simultaneously cutting the second-mentioned variable condenser into circuit therewith in place of said first-mentioned variable condenser.

8. A variable condenser comprising relatively movable condenser elements of opposite polarity, one of said elements being sub-divided into separate parts insulated from each other, whereby in different relative positions of said elements, each of said above-mentioned parts, with a co-acting portion of the other condenser element, forms a separate variable capacity.

9. A variable condenser comprising relatively movable condenser elements of opposite polarity, one of said elements being sub-divided into separate parts insulated from each other, whereby in different relative positions of said elements each of the above-mentioned parts with a co-acting portion of the other condenser elements forms a separate variable capacity, said part being so disposed relative to the other condenser element that upon relative movement between the condenser elements the capacity of one part increases, while that of another part decreases.

10. A variable condenser comprising relatively movable condenser elements of opposite polarity, one of said elements having an active area which is substantially an even multiple of the area of the other element, said first-mentioned element being sub-divided into parts insulated from each other, and each substantially equal in active area to said second-mentioned condenser element, said parts being disposed successively along the path of relative motion between said elements, whereby during such motion said second-mentioned element co-acts successively with portions of said first-mentioned element to form a variable capacity.

11. A variable condenser comprising condenser elements of opposite polarity movable angularly relatively to each other, one of said elements having substantially the shape of the sector of a circle, and the other of said elements being sub-divided into separate parts insulated from the other, whereby in different relative angular positions of said elements each of said above-mentioned parts with a co-acting portion of the first-mentioned condenser element, forms a separate variable capacity, said parts each having substantially the form of the sector of a circle, and being so angularly displaced relative to the portions of the first-mentioned condenser element with which they co-act, that upon angular movement between said elements, the capacity of one part increases while that of another part decreases.

12. A variable condenser comprising condenser elements of opposite polarity rotatable relative to each other, one of said elements extending substantially entirely around the circle of rotation, and the other of said elements being substantially in the form of a sector of a circle, said first-mentioned element being sub-divided into separate sectors insulated from the other and each substantially equal in area to said second-mentioned element.

13. A variable condenser comprising separate variable capacities, means for positioning one of said capacities at maximum when the other is substantially at minimum, and switching means for throwing said first-mentioned capacity out of circuit and said second-mentioned capacity into circuit substantially when said first mentioned capacity reaches maximum.

14. A variable condenser comprising separate variable capacities, the movable elements of said capacities being so disposed that the capacity of one of said variable capacities varies inversely with that of another, a common operating member for the movable elements of said capacities, and means for changing circuit from the first-mentioned variable capacity to the second-mentioned variable capacity substantially when the former is at a maximum, and that of the latter at minimum.

15. A variable condenser comprising separate variable capacities, a common operating memebr for changing the position of the movable element of each of said capacities, and switching means for throwing said capacities into and out of circuit.

16. A variable condenser comprising relatively movable condenser elements, one of said elements being sub-divided into separate parts insulated from each other, and means for throwing said parts into and out of circuit.

17. A variable condenser comprising relatively movable condenser elements, one of said elements being sub-divided into separate parts insulated from each other, an operating member for changing the relative positions of said elements, and a switching device actuated by movement of said operating member for throwing said parts into and out of circuit.

18. A variable condenser comprising relatively movable condenser elements of opposite polarity, one of said elements being sub-divided into separate parts insulated from each other, whereby in different relative positions of said elements, each of said above-mentioned parts, with a co-acting portion of the other condenser element, forms a separate variable capacity, and switching means for selectively including in circuit the parts of above-mentioned condenser element.

19. A variable condenser comprising relatively movable condenser elements of opposite polarity, one of said elements being sub-divided into separate parts insulated from each other, whereby in different relative positions of said elements each of said above-mentioned parts, with a co-acting portion of the other condenser element, forms a separate variable capacity, said parts being so disposed relative to the other condenser element that upon relative movement between the condenser elements, the capacity of said parts varies inversely, and switching means for throwing said first-mentioned part out of circuit when its capacity is substantially at a maximum, and for throwing in said second-mentioned part when its capacity is substantially at a minimum.

20. A variable condenser comprising separate variable capacities, a common operating member for changing the position of the movable element of each of said capacities, and switching means for throwing said capacities into and out of circuit, said switching means being actuated from said operating member.

21. A variable condenser comprising separate variable capacities, a common member for the movable elements of said capacities, the movable elements of said capacities being so disposed that the capacity of one of said variable capacities varies inversely with that of another.

In testimony that I claim the foregoing, I have hereunto set my hand this 27th day of September, 1921.

WILLIAM DUBILIER.